J. B. YOUNG.
LOCK NUT.
APPLICATION FILED JAN. 20, 1912.

1,047,870.

Patented Dec. 17, 1912.

Witnesses
Carroll Bailey

Inventor
J. B. Young.
By Victor J. Evans
Attorney

UNITED STATES PATENT OFFICE.

JOHN B. YOUNG, OF LOS ANGELES, CALIFORNIA.

LOCK-NUT.

1,047,870.  Specification of Letters Patent.  Patented Dec. 17, 1912.

Application filed January 20, 1912. Serial No. 672,293.

*To all whom it may concern:*

Be it known that I, JOHN B. YOUNG, a citizen of the United States, residing at Los Angeles, in the county of Los Angeles and State of California, have invented new and useful Improvements in Lock-Nuts, of which the following is a specification.

The invention relates to nut locks, and has for its primary object to provide a nut lock in which the nut will be firmly fastened on the bolt to prevent the loosening thereof when subjected to shocks and jars, and that will permit the easy and quick removal of the nut should it be desired to detach the bolt from or adjust it in the work.

Another object of the invention is the provision of a nut lock in which the nut may be locked on the bolt, at any desired point thereof, so that said nut will positively and firmly hold.

A further object of the invention is the provision of a nut lock of this character which is simple in construction, thoroughly reliable and efficient in its purpose, and inexpensive in manufacture.

With these and other objects in view, the invention consists in the construction, combination and arrangement of parts, as will be hereinafter more fully described, illustrated in the accompanying drawings, and pointed out in the claim hereunto appended.

Figure 1:
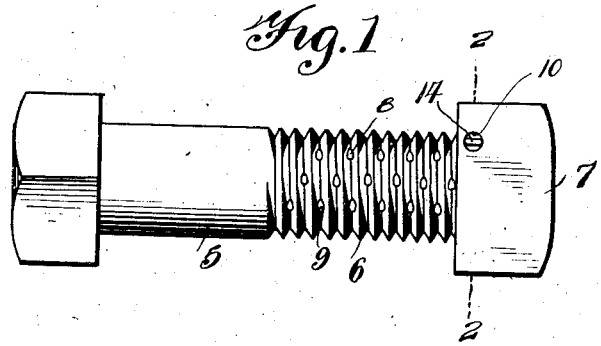
Figure 2:
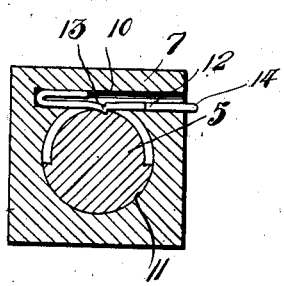
Figure 3:
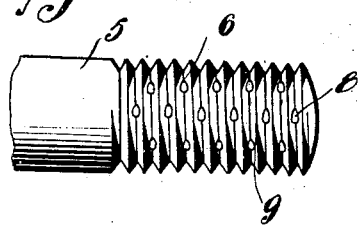
Figure 4:

In the drawings: Figure 1 is a side elevation of a nut and bolt with the invention applied thereto. Fig. 2 is a sectional view on the line 2—2 of Fig. 1. Fig. 3 is a fragmentary side elevation of the threaded end of the bolt. Fig. 4 is a detail view of the catch member removed from the nut.

Similar reference characters indicate corresponding parts throughout the several views of the drawings.

Referring to the drawings by numerals, 5 designates a bolt which is of the ordinary well-known construction, having the usual threaded shank 6, on which is mounted a nut 7, as usual, the shank 6 being provided, between the threads thereon, with a plurality of depressions 8 forming ratchet teeth or locking shoulders 9 which are adapted to be engaged by the nut lock, presently described.

Formed in the nut 7 is a bore 10, the same opening through one side thereof and into the usual central bolt receiving opening 11, and in which is arranged the nut lock comprising a single strand of relatively stiff wire 12, bent to provide a latch nose 13, and a finger-engaging extremity 14, the wire 12 being fastened in the bore 10 in any suitable manner, so that its latch nose 13 will normally project into the bolt opening 11 for engagement with the shoulders 9, thereby locking the nut 7 in adjusted position on the threaded end of the shank 6 of the bolt. It will be apparent that when it is desired to remove the nut 7 from the shank 6 of the bolt, it is only necessary to engage the finger extremity 14 of the wire 12, pressing it in a direction to retract the latch nose 13, thereby disengaging the same from the shoulders 9, thus freeing the said nut, so that the same may be worked from the shank of the bolt.

What is claimed is:

The combination with a bolt provided with a threaded shank having depressions forming shoulders between the threads, of a nut engaging the threaded shank and having a bore opening through one side thereof and communicating with its bolt opening, a spring catch comprising a resilient wire-like member having an outwardly and inwardly bent end, the said member being engaged in the bore and having the said end abutting against the top surface thereof, and a nib struck from the said member and engageable with the shoulders on the shank for locking the nut in adjusted position thereon.

In testimony whereof I affix my signature in presence of two witnesses.

JOHN B. YOUNG.

Witnesses:
I. V. GREINER,
WESLEY H. BEACH.